(12) United States Patent  
Kuroki et al.

(10) Patent No.: US 9,301,232 B2  
(45) Date of Patent: Mar. 29, 2016

(54) MANAGEMENT APPARATUS OF CONTROLLER FOR COMMUNICATION NETWORK

(71) Applicant: KDDI CORPORATION, Tokyo (JP)

(72) Inventors: Keisuke Kuroki, Fujimino (JP); Michiaki Hayashi, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 87 days.

(21) Appl. No.: 14/196,811

(22) Filed: Mar. 4, 2014

(65) Prior Publication Data

US 2015/0257069 A1    Sep. 10, 2015

(51) Int. Cl.
| | |
|---|---|
| *H04L 1/00* | (2006.01) |
| *H04W 36/22* | (2009.01) |
| *H04W 36/08* | (2009.01) |

(52) U.S. Cl.
CPC .............. *H04W 36/22* (2013.01); *H04W 36/08* (2013.01)

(58) Field of Classification Search
CPC ......... H04L 47/10; H04L 47/11; H04L 47/12; H04L 47/13; H04L 47/14
USPC ......................................... 370/221, 229–231
See application file for complete search history.

(56) References Cited

U.S. PATENT DOCUMENTS

| | | | | |
|---|---|---|---|---|
| 5,278,890 | A * | 1/1994 | Beeson et al. ............... | 340/7.24 |
| 7,536,167 | B2 * | 5/2009 | Gollnick et al. ........... | 455/343.4 |
| 7,577,435 | B2 * | 8/2009 | Tamura et al. ................ | 455/436 |

FOREIGN PATENT DOCUMENTS

JP    2011-160363 A    8/2011

OTHER PUBLICATIONS

Kuroki et al., "Consideration of a 1:1 Redundancy Method for OpenFlow Controller", Proceedings of the 2013 IEICE General Conference, The Institute of Electronics, Information and Communication Engineers, Mar. 5, 2013.

* cited by examiner

*Primary Examiner* — Dady Chery
(74) *Attorney, Agent, or Firm* — Westerman, Hattori, Daniels & Adrian, LLP

(57) ABSTRACT

A management apparatus for managing a plurality of controllers in a communication system, in which communication apparatuses belonging to a network are grouped into a plurality of groups, the plurality of controllers respectively corresponding to the plurality of groups are arranged, and each controller controls communication apparatuses of a corresponding group, is provided. The management apparatus includes a determination unit configured to determine failure states of the plurality of controllers, a selection unit configured to select, based on load values indicating load states of the plurality of controllers, at least one handover controller to which control of communication apparatuses of a group corresponding to a controller in the failure state will be handed over, and a notification unit configured to notify that the control of the communication apparatuses of the group corresponding to the controller in the failure state will be handed over to the handover destination controller.

19 Claims, 7 Drawing Sheets

F I G. 2

| SWITCH GROUP IDENTIFIER | NUMBER OF SWITCH APPARATUSES | CONTROLLER 2-1 | CONTROLLER 2-2 | ... | CONTROLLER 2-n |
|---|---|---|---|---|---|
| 10-1 | 100 | MASTER | SLAVE | ... | SLAVE |
| 10-2 | 200 | SLAVE | MASTER | ... | SLAVE |
| ... | ... | ... | ... | ... | ... |
| 10-n | 150 | SLAVE | SLAVE | ... | MASTER |
| CPU LOAD FACTOR | | 30% | 70% | ... | 50% |
| SETTING INFORMATION | | SETTING A | SETTING B | ... | SETTING C | ps-extracted content follows:

MANAGEMENT APPARATUS OF CONTROLLER FOR COMMUNICATION NETWORK

BACKGROUND OF THE INVENTION

1. Field of the Invention

The present invention relates to a network control technique.

2. Description of the Related Art

As network control, the OpenFlow technique is attracting attention. A network which uses the OpenFlow technique includes a switch apparatus as a communication apparatus for processing a packet, and a controller which decides, when the switch apparatus receives a packet belonging to a new flow, a path for the flow, and notifies each communication apparatus on the decided path of the output interface of the packet to update a flow table. Note that the flow table indicates the correspondence between information for specifying a flow to which a packet belongs and the output interface of a packet belonging to the flow.

When the controller fails, the switch apparatus which is notified of the output interface by the controller cannot transfer a packet belonging to a new flow. To solve this problem, Japanese Patent Laid-Open No. 2011-160363 discloses an arrangement in which each of a plurality of controllers individually calculates a path for a flow, and notifies a switch apparatus on the path of the output interface of a packet belonging to a new flow. In a method described in Japanese Patent Laid Open No. 2011-160363, a switch apparatus may receive an instruction of an output interface from one or more controllers, but the switch apparatus transfers a packet according to the instruction received first.

In the method described in Japanese Patent Laid Open No. 2011-160363, since the switch apparatus receives an instruction to update a flow table from a plurality of controllers, the load of the switch apparatus temporarily becomes high. Furthermore, since each controller individually decides a path for a flow, unused flow information remains in a flow table in a switch apparatus on an unselected path.

Unlike Japanese Patent Laid Open No. 2011-160363, an arrangement in which a plurality of controllers are arranged and each switch apparatus is controlled by one of the controllers instead of the plurality of controllers is considered. In this case, when a given controller fails, it is necessary to quickly hand over the control of a switch apparatus controlled by the given controller to another controller. This poses problems about how to monitor a failure of a controller and how to decide a controller to which the control of a switch apparatus controlled by a controller that has failed is handed over.

SUMMARY OF THE INVENTION

According to one aspect of the present invention, there is provided a management apparatus for managing a plurality of controllers in a communication system in which communication apparatuses belonging to a network are grouped into a plurality of groups, the plurality of controllers respectively corresponding to the plurality of groups are arranged, and each controller controls communication apparatuses of a corresponding group. The management apparatus comprises a determination unit configured to determine failure states of the plurality of controllers, a selection unit configured to select, based on load values indicating load states of the plurality of controllers, at least one handover destination controller to which control of communication apparatuses of a group corresponding to a controller that is in the failure state will be handed over, and a notification unit configured to notify that the control of the communication apparatuses of the group corresponding to the controller which is in the failure state will be handed over to the at lease one handover destination controller selected by the selection unit.

According to another aspect of the present invention, there is provided a management apparatus for managing a plurality of controllers in a communication system in which communication apparatuses belonging to a network are grouped into a plurality of groups, the plurality of controllers respectively corresponding to the plurality of groups are arranged, and each controller controls communication apparatuses of a corresponding group. The management apparatus comprises a determination unit configured to, if no signal indicating a normal state is received from a first controller among the plurality of controllers, send an existence confirmation request for the first controller to a second controller among the plurality of controllers except for the first controller, and determine whether the first controller is in a failure state, based on a number of reports indicating that the first controller is normal and a number of reports indicating that the first controller is abnormal received from the second controller.

According to still another aspect of the present invention, there is provided a management apparatus for managing a plurality of controllers in a communication system in which communication apparatuses belonging to a network are grouped into a plurality of groups, the plurality of controllers respectively corresponding to the plurality of groups are arranged, and each controller controls communication apparatuses of a corresponding group. The management apparatus comprises a determination unit configured to, if no signal indicating a normal state is received from a first controller among the plurality of controllers, transmit an existence confirmation signal requiring a response to each of host apparatuses connected to communication apparatuses of a group corresponding to the first controller, and determine whether the first controller is in a failure state, based on a number of the transmitted existence confirmation signals and a number of responses to the existence confirmation signal.

Further features of the present invention will become apparent from the following description of exemplary embodiments with reference to the attached drawings.

BRIEF DESCRIPTION OF THE DRAWINGS

FIG. 2 is a table showing exemplary management information held by a management apparatus according to an embodiment.

DESCRIPTION OF THE EMBODIMENTS

Exemplary embodiments of the present invention will be described below with reference to the accompanying drawings. Note that components which are not necessary for a description of the embodiments will be omitted from the accompanying drawings.

Figure 1:
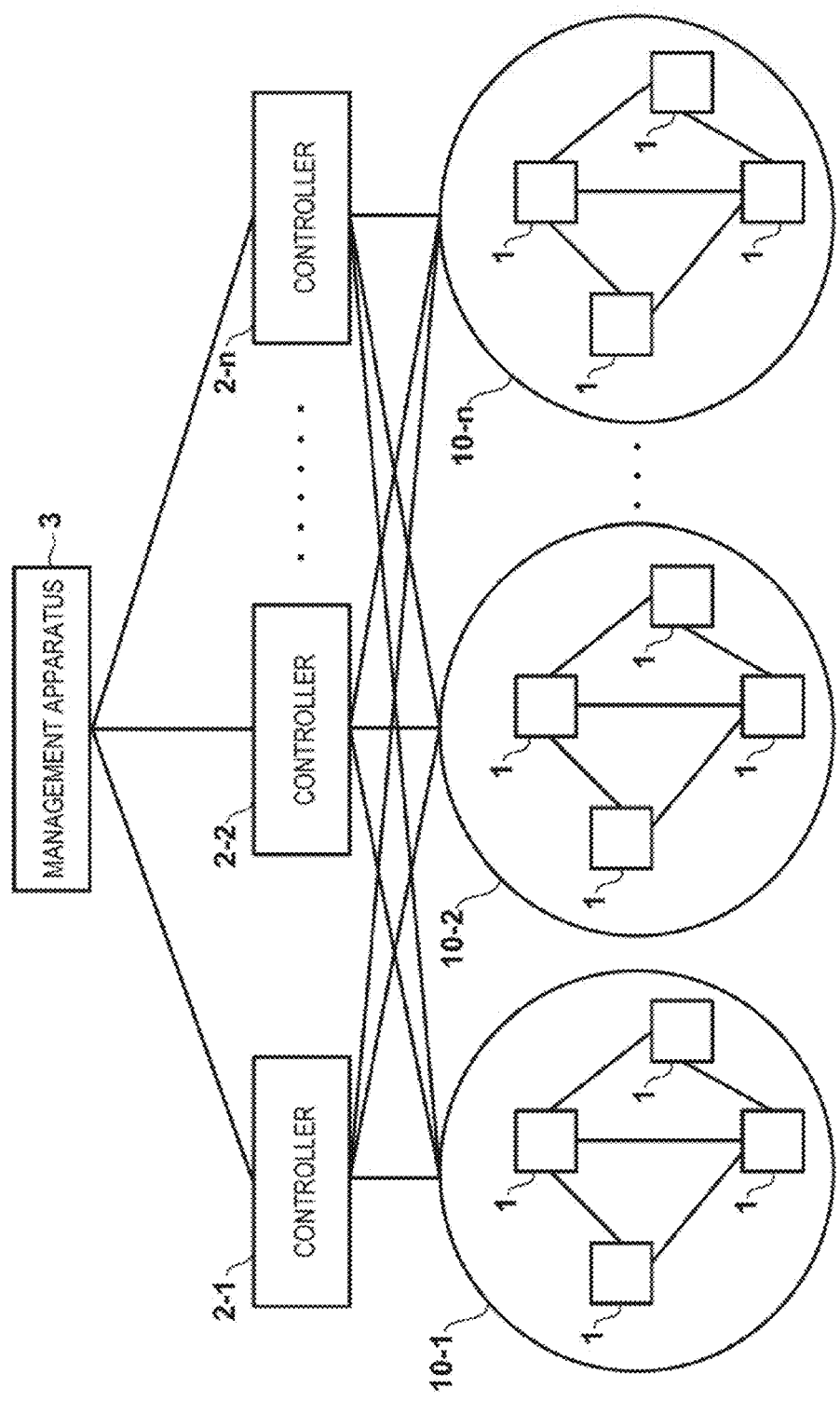
FIG. 1 is a view showing an exemplary system configuration according to an embodiment.

FIG. 1 is a view showing an exemplary system configuration according to a present embodiment. A network includes a plurality of switch apparatuses 1. Each switch apparatus 1 is classified into one of n switch groups 10-1 to 10-$n$ (n is an integer of 2 or more). Note that in FIG. 1, each switch apparatus 1 is represented to have links with only the switch apparatuses 1 of the same switch group for the sake of simplicity. In fact, however, there are also links across the switch groups, and classifying the switch apparatuses 1 into the switch groups is irrelevant to the connection configuration between the switch apparatuses 1.

In this embodiment, n controllers 2-1 to 2-$n$ are arranged to correspond to the switch groups 10-1 to 10-$n$, respectively. Each of the controllers 2-1 to 2-$n$ controls the switch apparatuses 1 included in the corresponding switch group. That is, in a normal state, the controller 2-1 recognizes to only control the switch apparatuses 1 of the switch group 10-1, and the switch apparatuses 1 of the switch group 10-1 also recognize to be controlled by only the controller 2-1. In the normal state, therefore, upon receiving a notification of reception of a packet belonging to a new flow from a switch apparatus 1 belonging to the switch group 10-1, the controller 2-1 determines a path for the flow, and notifies, among switch apparatuses 1 of the switch group 10-1, switch apparatuses 1 on the determined path of an output interface to update a flow table. Note that each of the controllers 2-1 to 2-$n$ is configured to be accessible to all the switch apparatuses 1 in preparation for a failure.

Furthermore, in this embodiment, a management apparatus 3 is arranged to decide the state of each of the controllers 2-1 to 2-$n$, that is, whether the state is a normal state or failure state, and to decide, if a failure state is determined, one or more controllers to which the control of the switch apparatuses 1 controlled by the controller that is in the failure state is handed over.

FIG. 2 is a table for explaining information held by the management apparatus 3 according to the present embodiment. In the example shown in FIG. 2, the management apparatus 3 holds the switch groups 10-1 to 10-$n$ and the number of switch apparatuses 1 of each of the switch groups 10-1 to 10-$n$ in the normal state. Note that although not shown in FIG. 2, the management apparatus 3 also holds information for identifying each switch apparatus 1 of each of the switch groups 10-1 to 10-$n$, and information for making access, such as an IP address. In FIG. 2, "master" indicates a controller which controls the switch apparatuses 1 of the corresponding switch group in the normal state, and "slave" indicates a controller which does not control the switch apparatuses 1 in the normal state. For example, FIG. 2 shows that the switch apparatuses 1 of the switch group 10-1 are controlled by only the controller 2-1 in the normal state, and the switch apparatuses 1 of the switch group 10-2 are controlled by only the controller 2-2.

In the present embodiment, the management apparatus 3 acquires load information of each of the controllers 2-1 to 2-$n$. In the present embodiment, the CPU load factor of each of the controllers 2-1 to 2-$n$ is used as load information. Note that the management apparatus 3 acquires the CPU load factor from each controller at relatively short periods, for example, from about several second to several minute, and obtains and records an average value of the CPU load factors acquired at the relatively short periods during a predetermined period, for example, several days such as one week. Note that in the present embodiment, it is possible to calculate a load value indicating the load of each of the controllers 2-1 to 2-$n$ using memory usage or the like, or both the CPU load factor and memory usage instead of using the CPU load factors. Furthermore, as shown in FIG. 2, the management apparatus 3 holds setting information set for each of the controllers 2-1 to 2-$n$. More specifically, for example, it is described that setting information set for the controller 2-1 is setting information A and setting information set for the controller 2-2 is setting information B.

Figure 3:
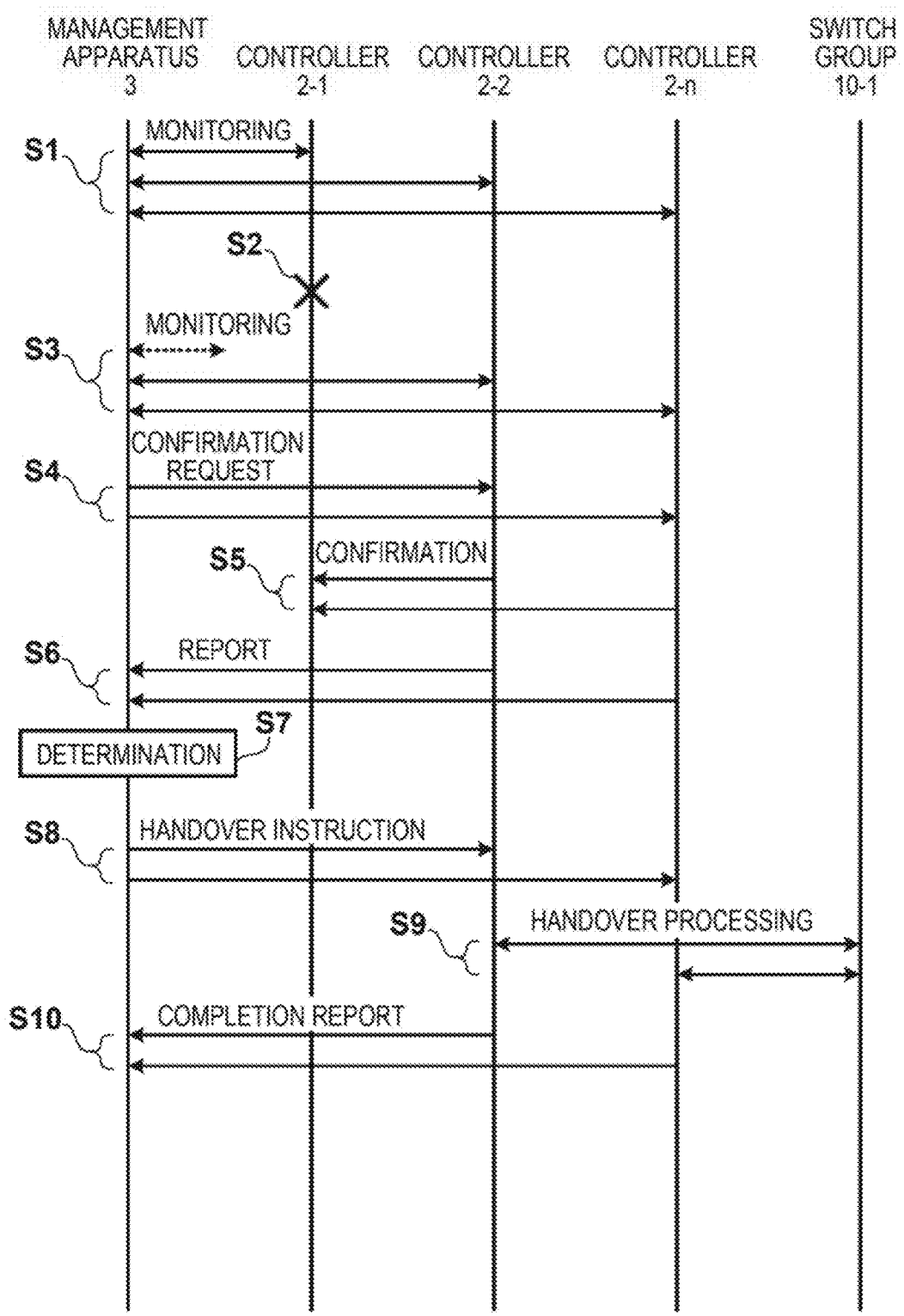
FIG. 3 is a sequence chart showing handover processing according to an embodiment.

Handover processing executed by the management apparatus 3 according to the present embodiment will be described with reference to FIG. 3. The management apparatus 3, for example, performs polling for the controllers 2-1 to 2-$n$, and the controllers 2-1 to 2-$n$ respond to the polling to notify the management apparatus 3 that they are normally operating (S1). Note that each of the controllers 2-1 to 2-$n$ may periodically transmit, to the management apparatus 3, a signal indicating that it is normally operating, instead of performing polling by the management apparatus 3.

Assume that, for example, the controller 2-1 fails (S2), and the management apparatus 3 detects that no response is received from the controller 2-1 (S3). At this time, the management apparatus 3 cannot determine whether the controller 2-1 has failed or only communication between the management apparatus 3 and the controller 2-1 has failed. Therefore, in S4, the management apparatus 3 requests the remaining controllers 2-2 to 2-$n$ to confirm the existence of the controller 2-1. In response to reception of an existence confirmation request signal from the management apparatus 3, each of the controllers 2-2 to 2-$n$ transmits an existence confirmation signal to the controller 2-1 in S5. Note that in the present embodiment, each controller is configured to transmit, upon receiving an existence confirmation signal, an existence report signal to the transmission source of the existence confirmation signal. In S6, each of the controllers 2-2 to 2-$n$ reports the result of confirming the existence of the controller 2-1 to the management apparatus 3. That is, if each of the controllers 2-2 to 2-$n$ receives an existence report signal from the controller 2-1, it reports to the management apparatus 3 that the controller 2-1 is normal. On the other hand, if each of the controllers 2-2 to 2-$n$ receives no existence report signal from the controller 2-1 within a predetermined period, it reports to the management apparatus 3 that the controller 2-1 is abnormal.

When the management apparatus 3 receives reports from all the controllers 2-2 to 2-$n$, or a predetermined period elapses after the confirmation request in S4, the management apparatus 3 determines whether the controller 2-1 has failed (S7). More specifically, the management apparatus 3 obtains the ratio of the number of reports indicating abnormality to the total number of reports which have been received from the controllers 2-2 to 2-$n$ and indicate an abnormal or normal state at the time of determination. If the obtained ratio is equal to or higher than a threshold, it is determined that the controller 2-1 has failed. If the management apparatus 3 determines that the controller 2-1 has failed, in S7 it decides a controller to which the control of all the switch apparatuses 1 belonging to the switch group 10-1 controlled by the controller 2-1 is handed over.

According to the decision in S7, the management apparatus 3 transmits handover instruction signals to the controllers 2-2 to 2-$n$ in S8. Each handover instruction signal contains information for specifying the switch apparatuses 1 whose control is handed over to the controller of the destination of the handover instruction signal, and setting information necessary for controlling the switch apparatuses 1. Note that it is not necessary to send a handover instruction signal to the controller to which the control of the controller 2-1 will not be handed over. In S9, a controller which receives the handover instruction signal notifies, among the switch apparatuses 1 of the switch group 10-1, the switch apparatuses 1 which are to be controlled by the controller of a change of controller. Note that the processing in S9 can use, for example, "Roll Request" defined by OpenFlow. Upon completion of the handover processing in S9, the controller to which the processing of the controller 2-1 has been handed over transmits a completion report signal to the management apparatus 3 in S10, and the management apparatus 3 saves information indicating a controller which controls each switch apparatus 1 belonging to the switch group 10-1 in addition to the information shown in FIG. 2.

Figure 4:
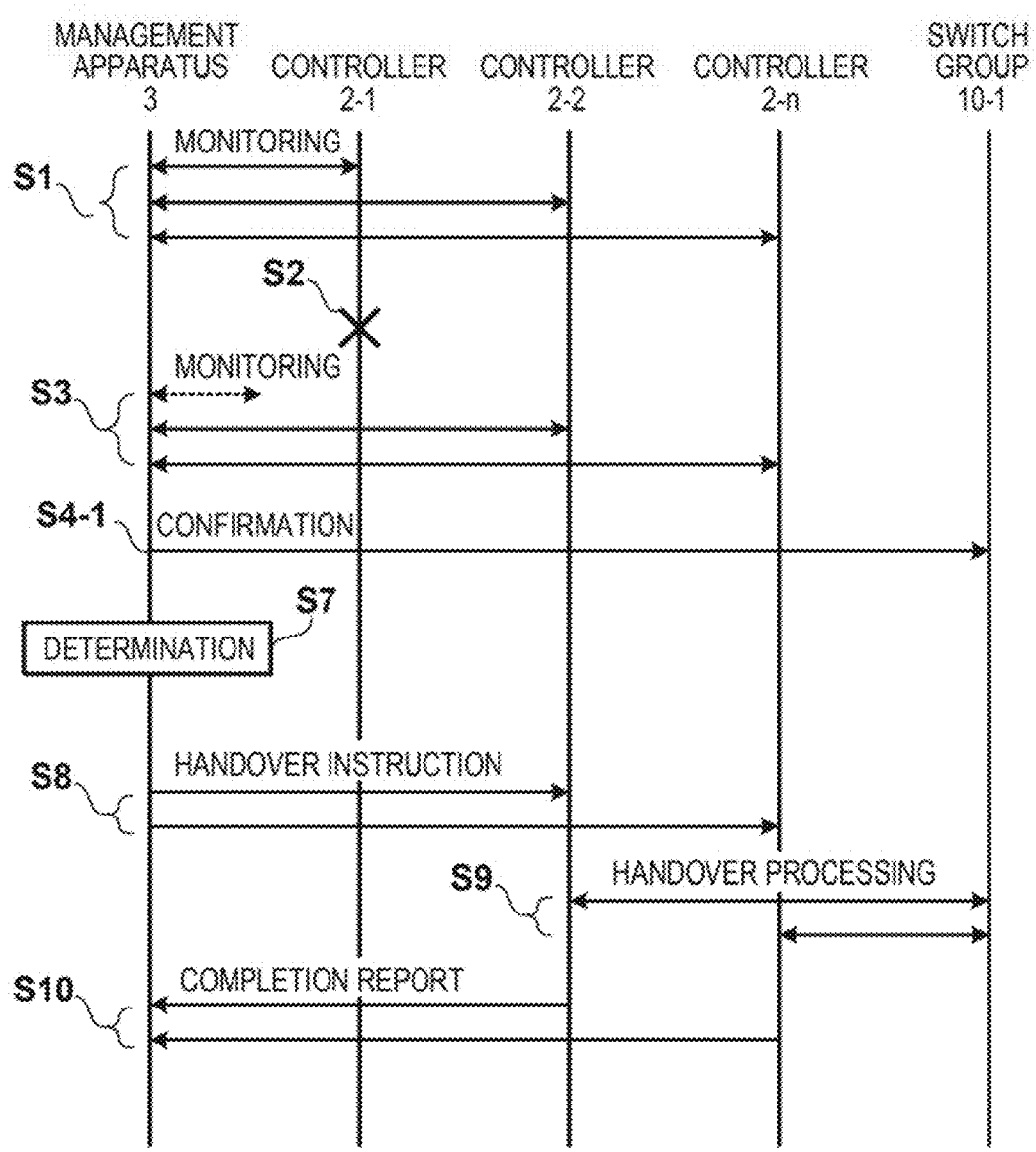
FIG. 4 is a sequence chart showing handover processing according to an embodiment.

FIG. 4 is a sequence chart showing handover processing executed by a management apparatus 3 according to another embodiment. The handover processing shown in FIG. 4 will be described by focusing on the difference from that shown in FIG. 3. Processing in S1 to S3 is the same as that in the handover processing of FIG. 3. In the present embodiment of FIG. 4, when the management apparatus 3 detects that no response is received from a controller 2-1, it executes processing of confirming the state of the controller 2-1 (S4-1). More specifically, the management apparatus 3 transmits an existence confirmation signal to each of a plurality of host apparatuses (not shown) connected to switch apparatuses 1 included in a switch group 10-1. Note that upon receiving the existence confirmation signal, the host apparatus transmits an existence report signal to the management apparatus 3. For example, an ICMP (Internet Control Message Protocol) echo request message can be used as an existence confirmation signal. In this case, the existence report signal serves as an ICMP echo response message. Since no signals reach the host apparatuses connected to the switch apparatuses 1 included in the switch group 10-1 without control of the controller 2-1, whether the controller 2-1 has failed is determined based on the ratio of the number of received existence report signals to that of transmitted existence confirmation signals in this embodiment. Subsequent processing is the same as in the handover processing shown in FIG. 3 and a description thereof will be omitted.

Figure 5:
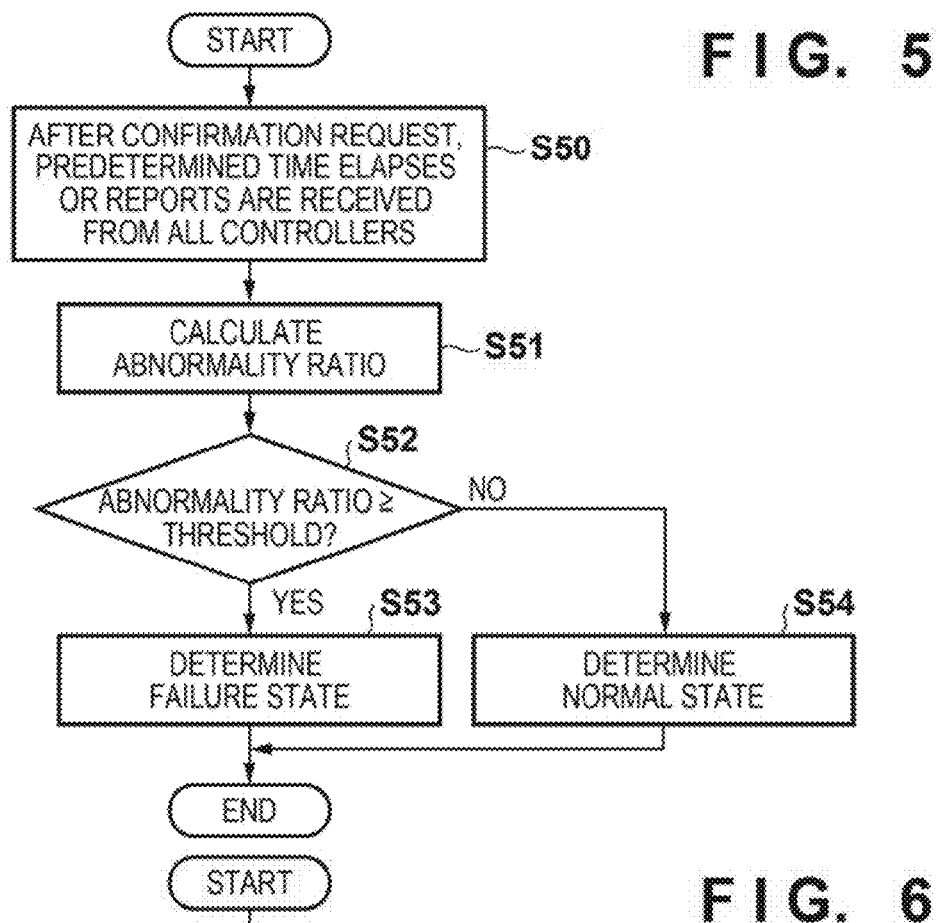
FIG. 5 is a flowchart illustrating failure determination processing according to an embodiment.

The controller failure determination processing executed by the management apparatus 3 in S7 of the handover processing shown in FIG. 3 will be described with reference to FIG. 5. After the management apparatus 3 sends confirmation requests in S4 of FIG. 3, when a predetermined time elapses or the management apparatus 3 receives reports from all the controllers to which the confirmation requests have been sent (step S50), the management apparatus 3 calculates an abnormality ratio in step S51. More specifically, at the time of calculation, the management apparatus 3 calculates the ratio of the number of reports indicating abnormality to that of reports received from the controllers. If the abnormality ratio is equal to or higher than a threshold (step S52), the management apparatus 3 determines in step S53 that the controller has failed; otherwise, the management apparatus 3 determines in step S54 that the controller is normal.

Figure 6:
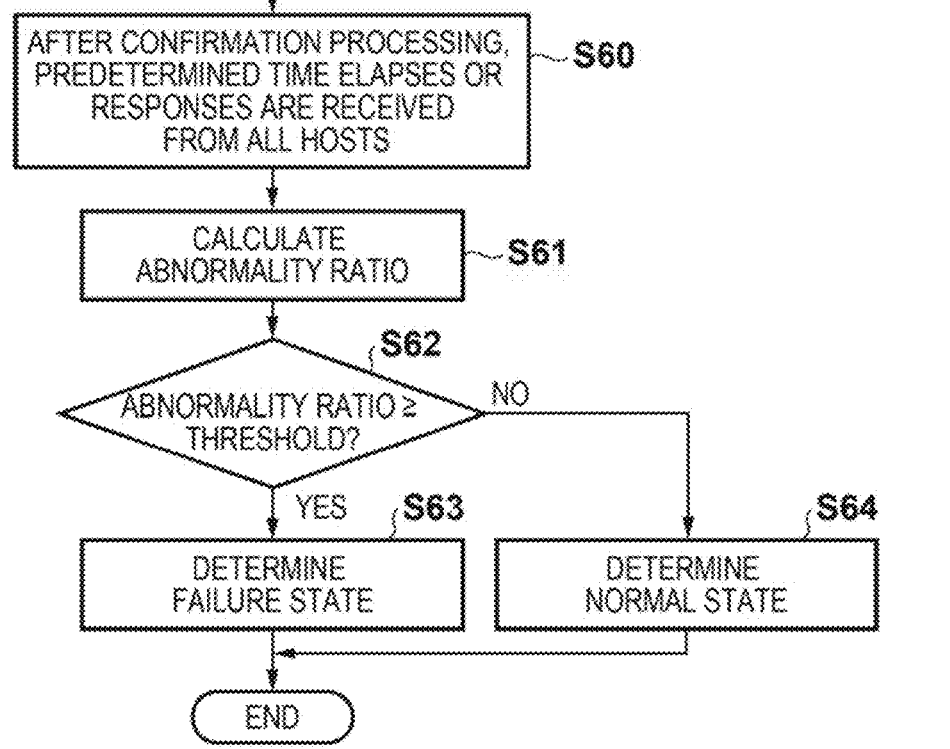
FIG. 6 is a flowchart illustrating failure determination processing according to an embodiment.

The controller failure determination processing executed by the management apparatus 3 in S7 of the handover processing shown in FIG. 4 will be described with reference to FIG. 6. After the management apparatus 3 performs the confirmation processing in S4-1 of FIG. 4, when a predetermined time elapses or the management apparatus 3 receives existence report signals from all the host apparatuses to which the existence confirmation signals have been transmitted (step S60), the management apparatus 3 calculates an abnormality ratio in step S61. More specifically, the management apparatus 3 calculates the ratio of the difference between the number of transmitted existence confirmation signals and that of received existence report signals at the time of calculation to the number of transmitted existence confirmation signals. If the abnormality ratio is equal to or higher than a threshold (step S62), the management apparatus 3 determines in step S63 that the controller has failed; otherwise, the management apparatus 3 determines in step S64 that the controller is normal. Note that it is possible to obtain a normality ratio as the ratio of the number of received existence report signals at the time of calculation to that of transmitted existence confirmation signals and, if the normality ratio is equal to or lower than a threshold, determine that the controller has failed.

Figure 7:
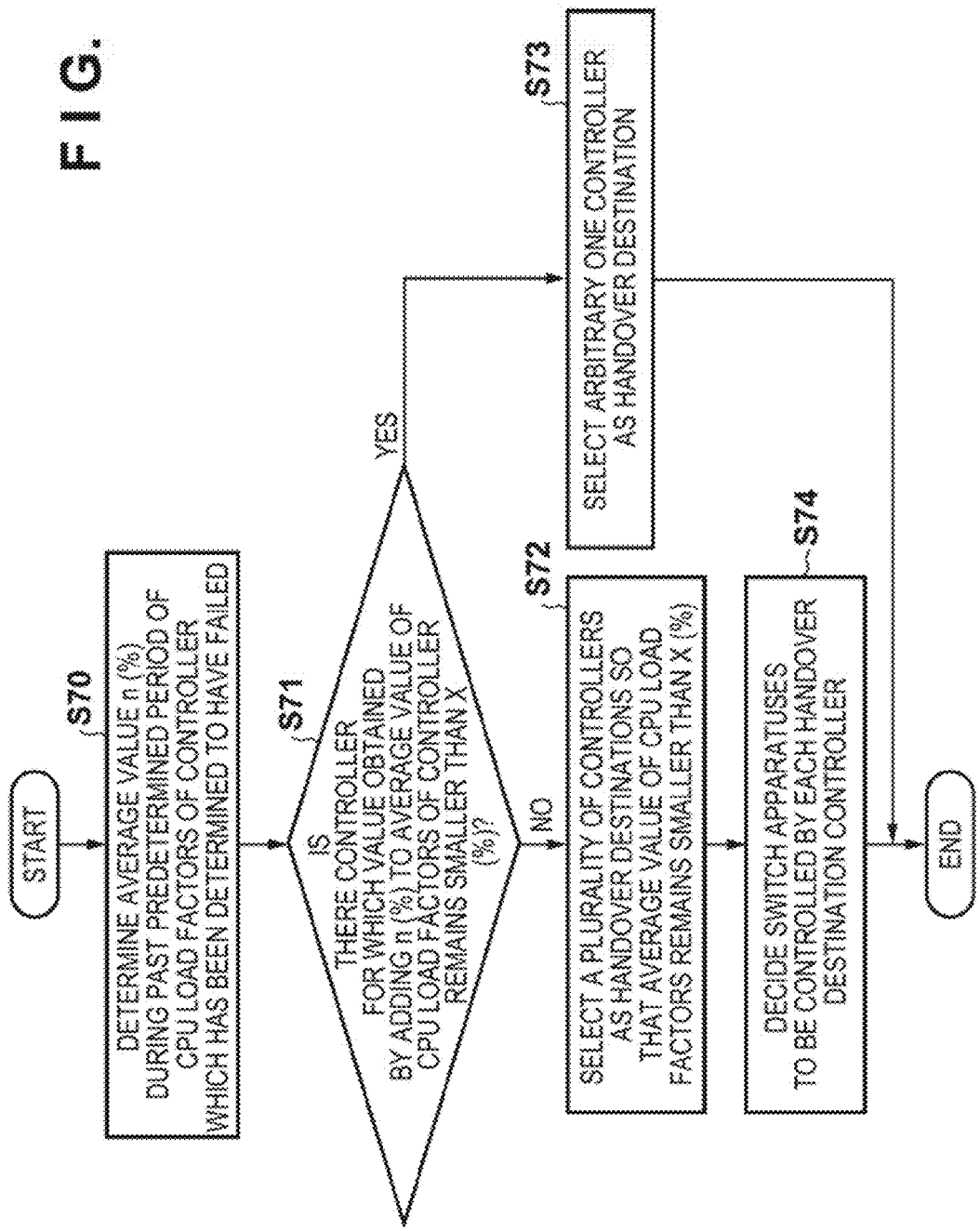
FIG. 7 is a flowchart illustrating handover destination decision processing according to an embodiment.

The handover destination decision processing executed by the management apparatus 3 in S7 of the handover processing shown in FIG. 3 or 4 will be described with reference to FIG. 7. If the management apparatus 3 determines that a given controller has failed by the failure determination processing explained with reference to FIG. 5 or 6, the management apparatus 3 determines or calculates, in S70, the load value during a past predetermined period of the controller which has been determined to have failed, that is, the average value n (%) of the CPU load factors in the present embodiment. It is then determined in step S71 whether there is a controller for which a value obtained by adding the average value n (%) of the CPU load factors of the controller that has failed to the average value of the CPU load factors of the controller remains smaller than a threshold X (%).

If it is determined in step S71 that there are controllers for which the value is smaller than the threshold X (%), in step S73 the management apparatus 3 decides an arbitrary one of the controllers as the handover destination of the controller which has failed. On the other hand, if it is determined in step S71 that there is no controller for which the value is smaller than the threshold X (%), in step S72 the management apparatus 3 selects a plurality of controllers as handover destinations so that the average value of the CPU load factors remains smaller than X (%). More specifically, for example, assume that the threshold X (%) is set to 80%, the average values of the CPU load factors of controllers A, B, and C are 50%, 50%, and 50%, respectively, and the average value of the CPU load factors of controller D which has failed is 60%. In this case, for example, the management apparatus 3 can distribute the average value 60% of the CPU load factors of controller D to each of controllers A and B by 30%. Furthermore, the management apparatus 3 can distribute the average value 60% of the CPU load factors of controller D to each of controllers B and C by 30%. Alternatively, the management apparatus 3 can distribute the average value 60% of the CPU load factors of controller D to each of controllers A, B, and C by 20%.

Note that a plurality of controllers can be selected in step S72 based on various criteria. For example, a plurality of controllers can be selected so that the number of handover destination controllers becomes smallest. This can minimize the number of controllers whose load increases. On the other hand, it is possible to select a plurality of controllers so that the number of handover destination controllers becomes largest. This can minimize an increase in load of a controller which is normally operating. Furthermore, it is possible to consider the installation positions of the controllers. For example, it is possible to select a controller arranged as close as possible. On the other hand, the installation positions of the controllers can be distributed as much as possible. It is also possible to select a controller whose margin of the CPU load factor, that is, whose average value of differences between the threshold X (%) and the CPU load factors is largest or smallest.

If the management apparatus decides a plurality of controllers as handover destinations in step S72, it decides switch apparatuses 1 to be controlled by each handover destination controller in step S74. Note that if only one handover destination controller is selected in step S73, the selected one controller controls all the switch apparatuses 1 controlled by the controller which has failed.

In step S74, for example, the management apparatus 3 determines the number of switch apparatuses controlled by each handover destination controller in accordance with the ratio of the margins of the CPU load factors. Assume, for example, that the controller which has failed controls 100 switch apparatuses 1, and the margins of handover destination controllers A and B are 30% and 10%, respectively. In this case, the control of 75 switch apparatuses 1 is handed over to controller A and the control of 25 switch apparatuses 1 is handed over to controller B. Note that a fraction is adjusted by an arbitrary method such as rounding.

Further, the management apparatus 3 can decide a handover destination based on the switch capacity of each switch apparatus. Assume, for example, that among the 100 switch apparatuses 1 controlled by the controller which has failed, each of 40 switches has a capacity of 100 Gbps, each of 40 switches has a capacity of 40 Gbps, and each of 20 switches has a capacity of 10 Gbps. If the margins of handover destination controllers A and B are 30% and 10%, respectively, the control of 30 switches having a capacity of 100 Gbps, 30 switches having a capacity of 40 Gbps, and 15 switches having a capacity of 10 Gbps is handed over to controller A. Since a switch having a large switch capacity handles a number of flows, and the frequency at which a controller performs control depends on a switch capacity, it is possible to suppress unevenness in control loads of the switch apparatuses by considering the switch capacities.

Figure 8:
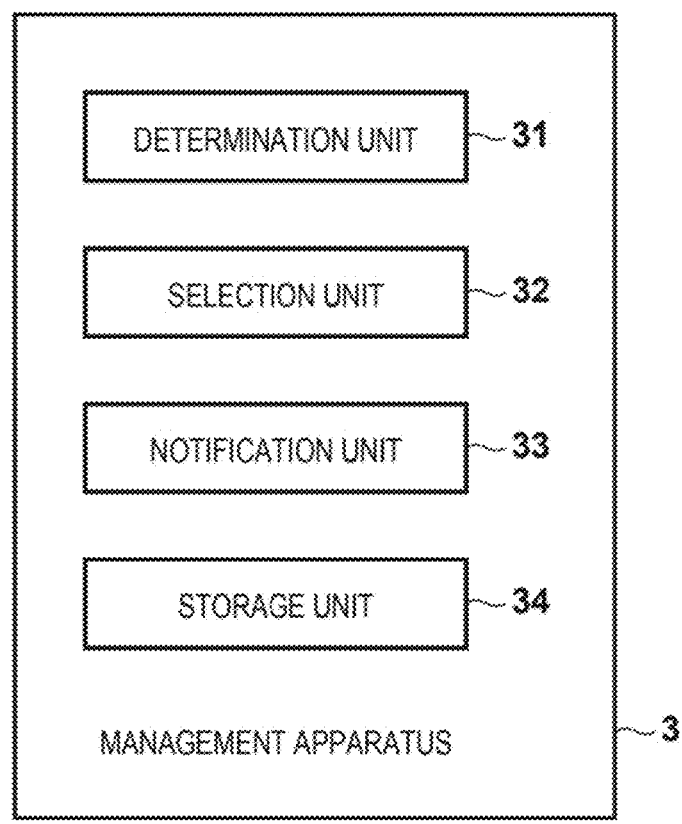
FIG. 8 is a block diagram showing a schematic arrangement of the management apparatus according to an embodiment.

FIG. 8 is a block diagram showing the schematic arrangement of the management apparatus according to the present embodiment. A storage unit 34 holds the management information described with reference to FIG. 2. A determination unit 31 performs the failure determination processing described with reference to FIG. 5 or 6. A selection unit 32 performs the handover destination decision processing described with reference to FIG. 7. As described in S8 of FIG. 3 or 4, a notification unit 33 notifies a handover destination controller selected by the selection unit 32 that the control of the communication apparatuses of a group corresponding to a controller which is in a failure state is to be handed over to the handover destination controller.

Note that the management apparatus 3 according to the present invention can be implemented by programs for causing a computer to operate as the above-described management apparatus 3. These computer programs can be stored in a non-transitory computer-readable storage medium or distributed via a network. Furthermore, the management apparatus 3 may be implemented by a single computer or a plurality of mutually communicable computers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A management apparatus for managing a plurality of controllers in a communication system, comprising:
    communication apparatuses belonging to a network are grouped into a plurality of groups, the plurality of controllers are arranged so that the plurality of controllers correspond to the plurality of groups, respectively, and each of the controller controls communication apparatuses of a corresponding group;
    a determination unit configured to determine failure states of the plurality of controllers;
    a selection unit configured to select, based on load values indicating load states of the plurality of controllers, at least one handover destination controller to which control of communication apparatuses of a group corresponding to a controller in the failure state will be handed over; and
    a notification unit configured to notify that the control of the communication apparatuses of the group corresponding to the controller in the failure state will be handed over to the at least one handover destination controller selected by the selection unit.

2. The management apparatus according to claim 1, further comprising
    a decision unit; and
    when the selection unit selects a plurality of handover destination controllers from among the plurality of controllers, the decision unit is configured to make decision regarding communication apparatuses whose control is handed over to each of the handover destination controllers, based on the load values of the handover destination controllers.

3. The management apparatus according to claim 2, wherein the decision unit is further configured to make decision regarding communication apparatuses whose control is handed over to each of the handover destination controllers according to a ratio of margins of the handover destination controllers, where the margins being differences between a predetermined threshold and the load values of the handover destination controllers.

4. The management apparatus according to claim 3, wherein said decision unit is further configured to classify the communication apparatuses of the group corresponding to the controller in the failure state according to switch capacities, and decide, for each switch capacity, communication apparatuses whose control is handed over to the handover destination controllers in accordance with the ratio of the margins of the handover destination controllers.

5. The management apparatus according to claim 1, wherein the selection unit is further configured to distribute the load value of the controller in the failure state to at least the one handover destination controller, and select at least the one handover destination controller so that a value obtained by adding the distributed load value to the load value of at least the one handover destination controller remains smaller than a predetermined threshold.

6. The management apparatus according to claim 1, wherein said determination unit is further configured to, if no signal indicating a normal state is received from a first controller among the plurality of controllers, send an existence confirmation request regarding the first controller to a second controller among the plurality of controllers except for the first controller, and determine whether the first controller is in the failure state, based on a number of reports indicating that the first controller is normal and a number of reports indicating that the first controller is abnormal received from the second controller.

7. The management apparatus according to claim 1, wherein said determination unit is further configured to, if no signal indicating a normal state is received from a first controller among the plurality of controllers, transmit an existence confirmation signal requiring a response to each of host apparatuses connected to communication apparatuses of a group corresponding to the first controller, and determine whether the first controller is in the failure state, based on a number of the transmitted existence confirmation signals and a number of responses to the existence confirmation signals.

8. The management apparatus according to claim 1, wherein the load value is a load factor of a processor of the controller.

9. The management apparatus according to claim 1, wherein the management apparatus is implemented by at least one computer.

10. A management apparatus for managing a plurality of controllers in a communication system, comprising:
communication apparatuses belonging to a network are grouped into a plurality of groups, the plurality of controllers are arranged so that the plurality of controllers correspond to the plurality of groups, respectively, and each of the controller controls communication apparatuses of a corresponding group;
a determination unit configured to, if no signal indicating a normal state is received from a first controller among the plurality of controllers, send an existence confirmation request for the first controller to a second controller among the plurality of controllers except for the first controller, and determine whether the first controller is in a failure state, based on a number of reports indicating that the first controller is normal and a number of reports indicating that the first controller is abnormal received from the second controller.

11. The management apparatus according to claim 10, wherein the determination unit is further configured to determine whether the first controller is in the failure state by comparing, with a threshold, a ratio of a number of reports indicating that the first controller is abnormal to a sum of a number of reports indicating that the first controller is normal and a number of reports indicating that the first controller is abnormal.

12. The management apparatus according to claim 10, further comprising
a selection unit configured to, when the determination unit determines that the first controller is in the failure state, select at least one handover controller to which control of communication apparatuses of a group corresponding to the first controller will be handed over, based on load values indicating load states of the plurality of controllers; and
a notification unit configured to notify that the control of the communication apparatuses of the group corresponding to the first controller will be handed over to the handover destination controller selected by the selection unit.

13. The management apparatus according to claim 10, wherein the management apparatus is implemented by at least one computer.

14. A management apparatus for managing a plurality of controllers in a communication system, comprising:
communication apparatuses belonging to a network are grouped into a plurality of groups, the plurality of controllers are arranged so that the plurality of controllers correspond to the plurality of groups, respectively, and each of the controller controls communication apparatuses of a corresponding group;
a determination unit configured to, if no signal indicating a normal state is received from a first controller among the plurality of controllers, transmit an existence confirmation signal requiring a response to each of host apparatuses connected to communication apparatuses of a group corresponding to the first controller, and determine whether the first controller is in a failure state, based on a number of the transmitted existence confirmation signals and a number of responses to the existence confirmation signals.

15. The management apparatus according to claim 14, wherein said determination unit is further configured to determine whether the first controller is in the failure state by comparing a ratio of the number of responses to the number of the transmitted existence confirmation signals with a threshold.

16. The management apparatus according to claim 14, wherein the management apparatus is implemented by at least one computer.

17. A non-transitory computer-readable storage medium storing a program for causing a computer to manage a plurality of controllers in a communication system, where communication apparatuses belonging to a network are grouped into a plurality of groups, and where the plurality of controllers correspond to the plurality of groups, respectively so that each of the controller controls communication apparatuses of a corresponding group, by performing the following steps:
determining failure states of the plurality of controllers;
selecting, based on load values indicating load states of the plurality of controllers, at least one handover destination controller to which control of communication apparatuses of a group corresponding to a controller in the failure state will be handed over; and
notifying that the control of the communication apparatuses of the group corresponding to the controller in the failure state will be handed over to the at least one handover destination controller selected by the selection unit.

18. A non-transitory computer-readable storage medium storing a program for causing a computer to manage a plurality of controllers in a communication system, where communication apparatuses belonging to a network are grouped into a plurality of groups, and where the plurality of controllers correspond to the plurality of groups, respectively so that each of the controller controls communication apparatuses of a corresponding group, by performing the following steps:
sending, if no signal indicating a normal state is received from a first controller among the plurality of controllers, an existence confirmation request for the first controller to a second controller among the plurality of controllers except for the first controller, and
determining whether the first controller is in a failure state, based on a number of reports indicating that the first controller is normal and a number of reports indicating that the first controller is abnormal received from the second controller.

19. A non-transitory computer-readable storage medium storing a program for causing a computer to manage a plurality of controllers in a communication system, where communication apparatuses belonging to a network are grouped into a plurality of groups, and where the plurality of controllers correspond to the plurality of groups, respectively so that each of the controller controls communication apparatuses of a corresponding group, by performing the following steps:
transmitting, if no signal indicating a normal state is received from a first controller among the plurality of controllers, an existence confirmation signal requiring a response to each of host apparatuses connected to communication apparatuses of a group corresponding to the first controller, and determining whether the first controller is in a failure state, based on a number of the transmitted existence confirmation signals and a number of responses to the existence confirmation signals.

* * * * *